US011554902B2

(12) United States Patent
Patel et al.

(10) Patent No.: US 11,554,902 B2
(45) Date of Patent: Jan. 17, 2023

(54) ENERGY CONSERVATION DAMPER MECHANISMS FOR USE IN CONJUNCTION WITH FOOD PREPARATION OR FOOD STORAGE EQUIPMENT

(71) Applicant: A. J. ANTUNES & CO., Carol Stream, IL (US)

(72) Inventors: Bhupendra Patel, Carol Stream, IL (US); Ignacio Vega, Jr., Countryside, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 901 days.

(21) Appl. No.: 16/400,049

(22) Filed: May 1, 2019

(65) Prior Publication Data

US 2020/0346823 A1 Nov. 5, 2020

Related U.S. Application Data

(60) Provisional application No. 62/668,357, filed on May 8, 2018.

(51) Int. Cl.
*B65D 43/16* (2006.01)
*B65D 81/18* (2006.01)
*B65D 81/38* (2006.01)

(52) U.S. Cl.
CPC ............ *B65D 43/161* (2013.01); *B65D 81/18* (2013.01); *B65D 81/3813* (2013.01); *B65D 2251/1083* (2013.01); *B65D 2251/20* (2013.01)

(58) Field of Classification Search
CPC ........ B65D 43/14; B65D 43/16; B65D 43/00; B65D 43/161; B65D 81/18; B65D 81/3813; B65D 2251/1083; B65D 2251/20; A47J 2027/043; A47J 37/0807

See application file for complete search history.

(56) References Cited

U.S. PATENT DOCUMENTS 3,015,712 A * 1/1962 Dills .................... H05B 1/0208
    236/99 D
3,119,000 A * 1/1964 Loch .................. G05D 23/2754
    99/341
3,225,681 A * 12/1965 Wells .................. A47J 37/1219
    99/410

(Continued)

FOREIGN PATENT DOCUMENTS

DE    102011084571    4/2013
EP    3320778    5/2018

*Primary Examiner* — Kareen K Thomas
(74) *Attorney, Agent, or Firm* — Law Offices of Steven W. Weinrieb

(57) ABSTRACT

Damper mechanisms are provided in conjunction with housings of various different appliances and are disposed at first positions at which the dampers effectively close off or seal the interior regions of the appliances within which various heated, refrigerated, or frozen environments have been established. Such damper mechanisms can be moved to second positions so as to permit food items to be inserted into, or extracted from, the various housings of the appliances, but will automatically return to their first positions so as to again close off or seal the interior regions of the appliances. In this manner, thermal energy is preserved whereby the appliances are enabled to operate at peak energy efficiency.

19 Claims, 3 Drawing Sheets

(56) References Cited

U.S. PATENT DOCUMENTS

| | | | |
|---|---|---|---|
| 3,238,124 A | 3/1966 | Burton | |
| 3,298,300 A | 1/1967 | Grebow et al. | |
| 3,525,299 A * | 8/1970 | Gouwens | A47J 37/1219 99/410 |
| 3,940,016 A * | 2/1976 | Krakauer | G07F 11/42 221/129 |
| 4,065,658 A * | 12/1977 | Keim | A47J 37/0835 219/386 |
| 4,341,083 A | 7/1982 | Ibrahim et al. | |
| 4,530,276 A | 7/1985 | Miller | |
| 4,734,562 A * | 3/1988 | Amano | A47J 37/0635 219/412 |
| 5,018,438 A | 5/1991 | Grandi | |
| 5,152,420 A * | 10/1992 | Bird | B65F 1/02 220/495.08 |
| 5,378,872 A * | 1/1995 | Jovanovic | A21B 5/03 392/416 |
| 5,471,914 A * | 12/1995 | Krasznai | A47J 37/0807 219/405 |
| 5,579,952 A * | 12/1996 | Fiedler | G07F 9/105 219/521 |
| 5,694,831 A | 12/1997 | Haroun et al. | |
| 6,205,911 B1 | 3/2001 | Ochoa | |
| 6,444,954 B1 * | 9/2002 | Blankenship | F24C 7/06 219/386 |
| 7,105,778 B1 * | 9/2006 | DeLong | A47J 37/0635 99/357 |
| 7,312,423 B2 * | 12/2007 | Idomoto | F24C 15/22 219/405 |
| 7,323,663 B2 * | 1/2008 | Cavada | F24C 7/04 392/416 |
| 7,626,142 B2 * | 12/2009 | Backus | A47J 37/043 219/403 |
| 8,929,724 B1 * | 1/2015 | Mograbi | F24C 7/067 219/486 |
| 10,791,872 B2 * | 10/2020 | Nernberger | F24C 15/16 |
| 2006/0243721 A1 | 11/2006 | Sorensen et al. | |
| 2009/0173240 A1 | 7/2009 | Backus et al. | |
| 2010/0090572 A1 * | 4/2010 | Dunnigan | G07F 11/10 29/428 |
| 2011/0256286 A1 | 10/2011 | Ewald et al. | |
| 2013/0122158 A1 | 5/2013 | Hessel et al. | |
| 2015/0351409 A1 | 12/2015 | McKee | |

* cited by examiner

ENERGY CONSERVATION DAMPER MECHANISMS FOR USE IN CONJUNCTION WITH FOOD PREPARATION OR FOOD STORAGE EQUIPMENT

CROSS-REFERENCE TO RELATED PATENT APPLICATIONS

This patent application is a non-provisional conversion of U.S. Provisional Patent Application No. 62/668,357 which was filed on May 8, 2018, the priority benefits of which are hereby claimed.

FIELD OF THE INVENTION

The present invention relates generally to food preparation and food storage equipment, and more particularly to energy conservation dampers which are to be utilized in conjunction with such food preparation or food storage equipment so as to effectively prevent the loss of heat during the insertion and extraction of food products into and out from the food preparation equipment, as well as during those periods that the food preparation equipment is actually being utilized to prepare food items, or alternatively, in conjunction with food storage equipment wherein, in a similar manner, heat or cold conditions, prevalent within the particular food storage equipment, is desired to be preserved, so as to therefore effectively render the food preparation or food storage equipment more energy efficient.

BACKGROUND OF THE INVENTION

Various restaurant establishments employ various different types of food preparation equipment for use in connection with the preparation of various different food items in accordance with, for example, particular types of food items that the particular restaurant may serve to its patrons. Examples of such food preparation equipment may be, for example, radiant toasters, contact toasters, steamers, heated display cases, and the like. In addition, various food restaurants or retail food suppliers utilize various different types of food equipment for storing various different types of food items in preparation for sale to patrons. Examples of such equipment may comprise, for example, heated display cases for use within a commercial bakery for displaying various different food items intended to be sold to interested patrons, such as, for example, muffins, bread, pastries, and the like. Alternatively, some establishments may have various different types of refrigerated or frozen food storage containers for holding and storing various different types of cold or frozen foods until the food items are sold. Such equipment can comprise, for example, refrigerated or frozen-food containers having glass panels through which patrons can view the refrigerated or frozen items that they are interested in purchasing. Regardless of which type of food equipment is being utilized, the heated, refrigerated, or frozen environment characteristic of the particular food equipment needs to be preserved as best as possible so as to properly preserve the food items, but in addition, to prevent any significant amount of relatively cool air to enter or invade the heated environment, or to prevent the heated air within the heated environment from escaping the heated environment into a relatively cooler ambient environment, or in a similar manner, to prevent any significant amount of warm air to enter or invade the refrigerated or frozen environment, or to prevent the cold air within the refrigerated or frozen environment from escaping the refrigerated or frozen environment into the relatively warmer ambient environment. Still further, it is noted that when relatively warm air enters or invades the refrigerated or frozen environment, or when the refrigerated or frozen environment disposed within the refrigerated or frozen-food storage containers is permitted to escape into the relatively warmer ambient environment, or conversely, when relatively cool air enters or invades the heated environment, or when the heated environment disposed within the heated display cases is permitted to escape into the relatively cooler ambient environment, the food equipment must effectively work that much harder to preserve the particularly desired heated or refrigerated or frozen environment, whereby the equipment is not particularly energy efficient. It has been noted that one area or region of such food preparation or food storage containers that can effectively be improved, from an energy efficient viewpoint, are openings provided within such equipment through which food items are conventionally inserted or extracted.

A need therefore exists in the art for new and improved food preparation or food storage equipment. Another need exists in the art for new and improved food preparation or food storage equipment for use in connection with the preparation of various different food items in accordance with, for example, particular types of food items that a particular restaurant may serve to its patrons, or in connection with the storage of various different types of food items in preparation for sale to patrons. Still another need exists in the art for new and improved food preparation equipment, such as, for example, radiant toasters, contact toasters, steamers, and the like. Yet another need exists in the art for new and improved food storage equipment, such as, for example, heated display cases for use within a commercial bakery for displaying various different food items intended to be sold to interested patrons, such as, for example, muffins, bread, pastries, and the like, or various different types of refrigerated or frozen food storage containers for holding and storing various different types of cold or frozen foods until the food items are sold, such as, for example, refrigerated or frozen-food containers having glass panels through which patrons can view the refrigerated or frozen items that they may be interested in purchasing. A further need exists in the art for new and improved food equipment wherein, regardless of which type of food equipment is being utilized, the heated, refrigerated, or frozen environment characteristic of the particular food equipment needs to be preserved as best as possible so as to properly preserve the food items. A still further need exists in the art for new and improved food equipment wherein, regardless of which type of food equipment is being utilized, the heated, refrigerated, or frozen environment characteristic of the particular food equipment needs to be preserved as best as possible so as to properly preserve the food items, and in particular, wherein, to prevent any significant amount of, relatively cool air to enter or invade the heated environment, or to prevent the heated air within the heated environment from escaping the heated environment into a relatively cooler ambient environment. A yet further need exists in the art for new and improved food equipment wherein, regardless of which type of food equipment is being utilized, the heated, refrigerated, or frozen environment characteristic of the particular food equipment needs to be preserved as best as possible so as to properly preserve the food items, and in particular, wherein, to prevent any significant amount of warm air to enter or invade the refrigerated or frozen environment, or to prevent the cold air within the refrigerated or frozen environment from escaping the refrigerated or frozen environment into the relatively warmer ambient environment. An additional need exists in the art for new and improved food equipment wherein the amount of work that the food equipment must do to preserve the particularly desired heated or refrigerated or frozen environment, will be significantly reduced. A still additional need exists in the art for new and improved food equipment wherein the amount of work that the food equipment must do to preserve the particularly desired heated or refrigerated or frozen environment, will be significantly reduced whereby the equipment will exhibit enhanced energy efficiency.

OVERALL OBJECTIVES OF THE INVENTION

An overall objective of the present invention is to provide new and improved food preparation or food storage equipment. Another overall objective of the present invention is to provide new and improved food preparation or food storage equipment for use in connection with the preparation of various different food items in accordance with, for example, particular types of food items that a particular restaurant may serve to its patrons, or in connection with the storage of various different types of food items in preparation for sale to patrons. Still another overall objective of the present invention is to provide new and improved food preparation equipment, such as, for example, radiant toasters, contact toasters, steamers, and the like. Yet another overall objective of the present invention is to provide new and improved food storage equipment, such as, for example, heated display cases for use within a commercial bakery for displaying various different food items intended to be sold to interested patrons, such as, for example, muffins, bread, pastries, and the like, or various different types of refrigerated or frozen food storage containers for holding and storing various different types of cold or frozen foods until the food items are sold, such as, for example, refrigerated or frozen-food containers having glass panels through which patrons can view the refrigerated or frozen items that they may be interested in purchasing. A further overall objective of the present invention is to provide new and improved food equipment wherein, regardless of which type of food equipment is being utilized, the heated, refrigerated, or frozen environment characteristic of the particular food equipment needs to be preserved as best as possible so as to properly preserve the food items. A still further overall objective of the present invention is to provide new and improved food equipment wherein, regardless of which type of food equipment is being utilized, the heated, refrigerated, or frozen environment characteristic of the particular food equipment needs to be preserved as best as possible so as to properly preserve the food items, and in particular, wherein, to prevent any significant amount of relatively cool air to enter or invade the heated environment, or to prevent the heated air within the heated environment from escaping the heated environment into a relatively cooler ambient environment. A yet further overall objective of the present invention is to provide new and improved food equipment wherein, regardless of which type of food equipment is being utilized, the heated, refrigerated, or frozen environment characteristic of the particular food equipment needs to be preserved as best as possible so as to properly preserve the food items, and in particular, wherein, to prevent any significant amount of warm air to enter or invade the refrigerated or frozen environment, or to prevent the cold air within the refrigerated or frozen environment from escaping the refrigerated or frozen environment into the relatively warmer ambient environment. An additional overall objective of the present invention is to provide new and improved food equipment wherein the amount of work that the food equipment must do to preserve the particularly desired heated or refrigerated or frozen environment, will be significantly reduced. A still additional overall objective of the present invention is to provide new and improved food equipment wherein the amount of work that the food equipment must do to preserve the particularly desired heated or refrigerated or frozen environment, will be significantly reduced whereby the equipment will exhibit enhanced energy efficiency.

SUMMARY OF THE INVENTION

The foregoing and other objectives are achieved in accordance with the principles and teachings of the present invention by means of providing various different types of food equipment with movable damper mechanisms. The damper mechanisms may take any one of a multitude of different forms, and may be fabricated from a multitude of materials, such as, for example, thermoplastic materials, metals, polymers, or fabrics. In addition, the various materials may be coated with polytetrafluoroethylene (TEFLON®).

In accordance with a first embodiment of a damper mechanism as constructed in accordance with the principles and teachings of the present invention, wherein the damper mechanism may be utilized in conjunction with, for example, a radiant toaster having a horizontally oriented entry port defined within a side wall portion of the radiant toaster for permitting food items to be inserted into the radiant toaster so as to be toasted, the damper mechanism is provided as a pivotal damper mechanism which is effectively caused to pivot inwardly and upwardly, around a horizontally oriented pivotal axis, into the radiant toaster as the food item is inserted into the radiant toaster through its entry port. Once the food item has been fully inserted into the radiant toaster and effectively clears the entry port, the damper mechanism will be returned to its normal position as a result of being normally spring-biased toward such original position.

In accordance with a second embodiment of a damper mechanism as constructed in accordance with the principles and teachings of the present invention, wherein this damper mechanism may likewise be utilized in conjunction with, for example, a radiant toaster having a horizontally oriented entry port defined within a side wall portion of the radiant toaster for permitting food items to be inserted into the radiant toaster so as to be toasted, the damper mechanism is provided as a vertically oriented curtain comprising a plurality of vertically hanging, independently movable, strips of material. In a manner somewhat similar to the first embodiment damper, as the food item is inserted into the radiant toaster, the food item will effectively cause some of the plurality of vertically hanging, independently movable strips of material to be moved toward the sides of the radiant toaster, and out of the way of the food item being inserted into the radiant toaster, whereupon the food item being fully inserted into the radiant toaster and effectively clearing the entry port, the vertically oriented, hanging strips will automatically return to their normal vertically hanging dependent positions.

In accordance with a third embodiment of a damper mechanism as constructed in accordance with the principles and teachings of the present invention, wherein the damper mechanism may be utilized in conjunction with, for example, a contact toaster having a vertically oriented entry port defined within a top wall portion of a contact toaster for permitting food items to be inserted into the contact toaster so as to be toasted, the damper mechanism is provided as one or more pivotal damper mechanisms which are effectively caused to be deflected and thereby pivoted downwardly and inwardly into the contact toaster, around horizontally oriented pivotal axes, as the food item is inserted into the radiant toaster through its entry port. Once the food item has been fully inserted into the radiant toaster and effectively clears the entry port leading into the contact toaster, the damper mechanisms will be returned to their normal undeflected positions as a result of being spring-biased toward such normal undeflected positions.

In accordance with a fourth embodiment of a damper mechanism as constructed in accordance with the principles and teachings of the present invention, wherein the damper mechanism may be utilized in conjunction with, for example, a steamer having a horizontally oriented entry port defined within a front wall portion of the food equipment for permitting food items to be inserted into the steamer so as to be cooked by means of a particular steaming process, the damper mechanism is provided as a pivotal damper mechanism which is effectively caused to pivot inwardly and upwardly into the steamer, around a horizontally oriented pivotal axis, as the food item is inserted into the steamer through its entry port. The food item or items to be steamed are usually disposed within a tray or basket having a handle fixedly secured to a front wall or face of the tray or basket so as to permit food preparation personnel to easily manipulate the tray or basket having the food items disposed therein. Once the tray or basket has been fully inserted into the steamer, the damper mechanism will be maintained at its pivotal inward and upward position while the tray or basket also remains inserted into the steamer equipment. In this manner, the tray or basket effectively covers or closes off the entry port of the steamer, however, when the tray or basket is removed upon completion of the food steam-cooking process, the damper mechanism will then be permitted to return to its normal or original position, as a result of being spring-biased toward its normal or original position, whereby the damper mechanism will now serve to cover or close off the entry port of the steamer equipment.

Lastly, accordance with a fifth embodiment of a damper mechanism as constructed in accordance with the principles and teachings of the present invention, wherein the damper mechanism may be utilized in conjunction with, for example, a refrigerated food display storage container, or a frozen food display storage container, having a horizontally oriented entry port defined within, for example, a rear wall portion of the food equipment storage container so as to permit food items to be temporarily removed from the food display storage container by store personnel when, for example, a consumer desires a closer look at a particular food item so as to, for example, inspect the ingredients contained within the food item, the damper mechanism may comprise a pivotal damper mechanism which is pivotally mounted upon the rear wall portion of the food equipment storage container so as to be capable of being pivoted, inwardly and upwardly, or alternatively, outwardly and upwardly, around a horizontally oriented pivotal axis, so as to permit the store personnel to remove the food item from the food equipment storage container and to reinsert the food item back into the food equipment storage container through the entry port. In this manner, the refrigerated or frozen environment contained within the food equipment storage container can be readily and simply preserved by effectively preventing a significant amount of the refrigerated or frozen environment of the food equipment storage container from escaping from the internal environment defined within the food equipment storage container, or conversely, by effectively preventing a significant amount of relatively warm ambient air to enter or invade the refrigerated or frozen environment contained within the food equipment storage container.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
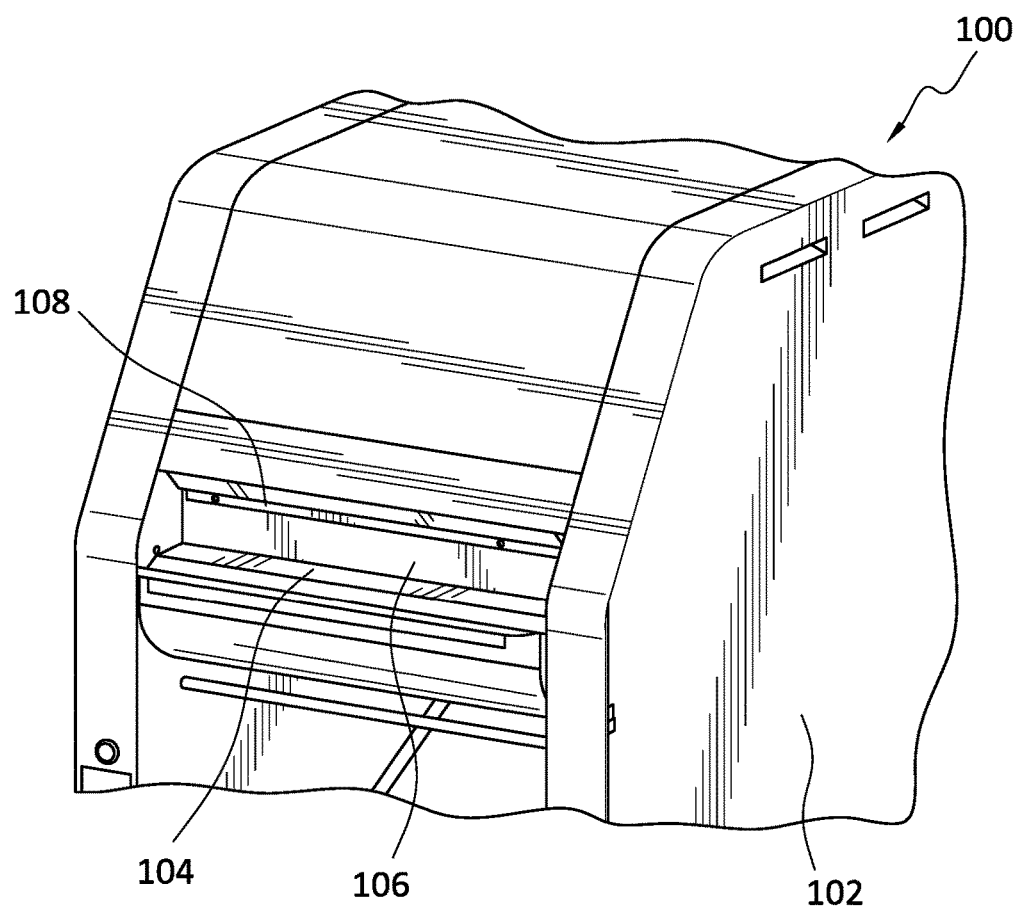
FIG. 1 is a schematic view of a radiant toaster having a horizontally oriented entry port defined within a side wall portion of the radiant toaster for permitting food items to be inserted into the radiant toaster so as to be toasted, and where a first embodiment of a damper mechanism, as constructed in accordance with the principles and teachings of the present invention, is provided as a pivotal damper mechanism which is effectively caused to be deflected and thereby pivot upwardly and inwardly, around a horizontally oriented pivotal axis, into the radiant toaster as the food item is inserted into the radiant toaster through the horizontally oriented entry port, whereupon the food item being fully inserted into the radiant toaster and clearing the entry port, the damper mechanism will return to its normal, undeflected position, under the biasing forces of suitable biasing springs, so as to again cover or close off the entry port in order to preserve thermal energy within the radiant heater.

With reference now being made to the drawings, and more particularly to FIG. 1 thereof, a particular piece of food equipment, such as, for example, a radiant toaster, is schematically illustrated and disclosed, and is generally indicated by the reference character 100. More particularly, it is seen that the radiant toaster 100 comprises a cabinet or housing 102 within which suitable radiant toasting components, not shown, are disposed. It is also seen that the front wall of the radiant toaster cabinet or housing 102 is provided with a horizontally oriented entry port 104 for permitting food items to be inserted into the radiant toaster 100 so as to be toasted. A first embodiment damper mechanism 106, as constructed in accordance with the principles and teachings of the present invention, is provided at the entry port 104 so as to normally cover or close off the entry port 104 while the radiant toaster 100 is being used to toast food items that have been inserted into the radiant toaster cabinet or housing 102, as well as when the radiant toaster 100 is not actually being used to toast food items, such as, for example, during those times when patron orders for toasted food items are not being processed. This normally closed disposition of the damper mechanism 106 with respect to the radiant toaster cabinet or housing 102 serves to effectively enclose or seal the radiant toaster cabinet or housing 102 so to prevent thermal energy disposed within the radiant toaster cabinet or housing 102 from escaping from the radiant toaster cabinet or housing 102, or conversely, for preventing relative cooler ambient air, external to the radiant toaster cabinet or housing 102, from entering or invading the heated internal region of the radiant toaster cabinet or housing 102. In either case, it can be readily appreciated that the heated environment contained internally within the radiant toaster cabinet or housing 102 will be preserved as best as possible so as to, in turn, preserve the thermal energy internally within the radiant toaster cabinet or housing 102 whereby the radiant toaster 100 can then operate at peak energy efficiency.

As can also be readily appreciated from FIG. 1, it is seen that the damper mechanism 106 comprises a pivotal damper mechanism which is effectively caused to be deflected, and thereby pivoted upwardly and inwardly, around a horizontally oriented pivot or hinge mechanism 108, into the radiant toaster 100 as the food item is inserted into the radiant toaster 100 through the horizontally oriented entry port 104. When the food item has been fully inserted into the radiant toaster 100 and has cleared the entry port 104, the damper mechanism 106 will return to its normal, undeflected position, under the biasing forces of suitable biasing springs, not shown, so as to again cover or close off the entry port 104 in order to preserve the thermal energy contained within the radiant heater 100.

Figure 2:
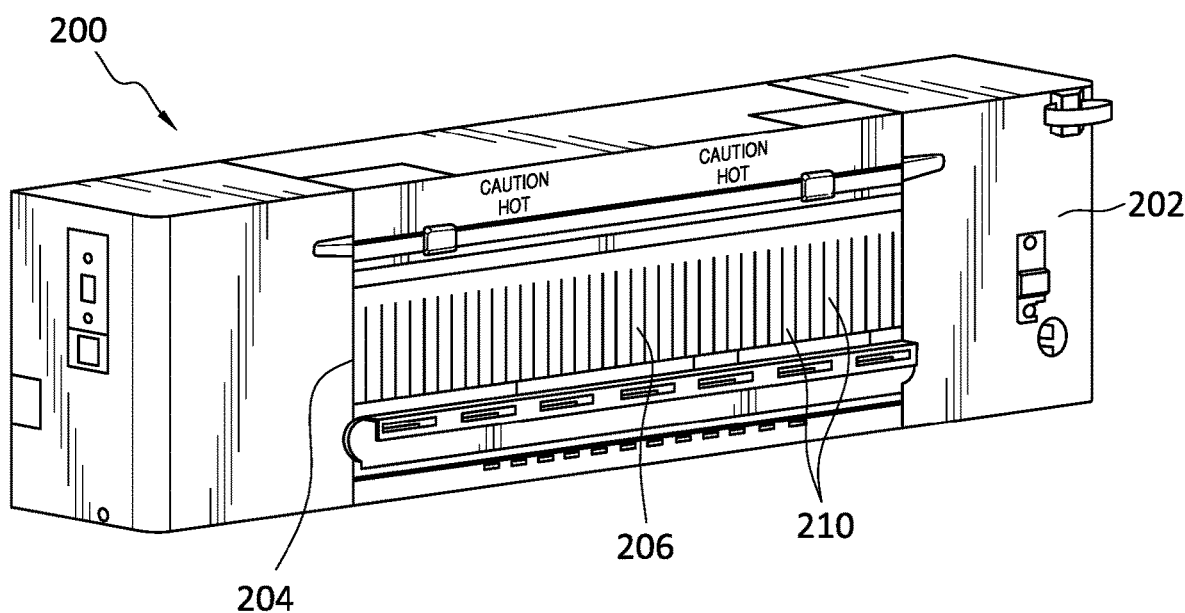
FIG. 2 is a schematic view of a radiant toaster having a horizontally oriented entry port defined within a side wall portion of the radiant toaster for permitting food items to be inserted into the radiant toaster so as to be toasted, and where a second embodiment of a damper mechanism, as constructed in accordance with the principles and teachings of the present invention, is provided as a vertically oriented curtain comprising a plurality of vertically hanging, independently movable, strips of material whereby, as the food item is inserted into the radiant toaster, the food item will effectively cause some of the plurality of vertically hanging, independently movable strips of material to be moved toward the sides of the radiant toaster, and out of the way of the food item being inserted into the radiant toaster, whereupon the food item being fully inserted into the radiant toaster and effectively clearing the entry port, the vertically oriented, hanging strips will automatically return to their normal vertically hanging dependent positions so as to again cover or close off the entry port in order to preserve thermal energy within the radiant heater.

With reference now being made to FIG. 2, food equipment, similar to the radiant heater 100 as disclosed within FIG. 1, and having a second embodiment damper mechanism operatively associated therewith, is disclosed and is generally indicated by the reference character 200. It is to be noted that component parts of this second embodiment food equipment or appliance 200, that correspond to similar component parts of the first embodiment food equipment or appliance 100, will be designated by corresponding reference characters except that they will be in the 200 series. More particularly, it is seen that the second embodiment food equipment or appliance comprises a radiant toaster 200 having a cabinet or housing 202 within which suitable radiant toasting components, not shown, are disposed. It is also seen that the front wall of the radiant toaster cabinet or housing 202 is provided with a horizontally oriented entry port 204 for permitting food items to be inserted into the radiant toaster 200 so as to be toasted. A second embodiment damper mechanism 206, as constructed in accordance with the principles and teachings of the present invention, is provided at the entry port 204 so as to normally cover or close off the entry port 204 while the radiant toaster 200 is being used to toast food items that have been inserted into the radiant toaster cabinet or housing 202, as well as when the radiant toaster 200 is not actually being used to toast food items, such as, for example, during those times when patron orders for toasted food items are not being processed. This normally closed disposition of the damper mechanism 206 with respect to the radiant toaster cabinet or housing 202 serves to effectively enclose or seal the radiant toaster cabinet or housing 202 so to prevent thermal energy disposed within the radiant toaster cabinet or housing 202 from escaping from the radiant toaster cabinet or housing 202, or conversely, for preventing relative cooler ambient air, external to the radiant toaster cabinet or housing 202, from entering or invading the heated internal region of the radiant toaster cabinet or housing 202. In either case, it can be readily appreciated that the heated environment contained internally within the radiant toaster cabinet or housing 202 will be, preserved as best as possible so as to, in turn, preserve the thermal energy internally within the radiant toaster cabinet or housing 202 whereby the radiant toaster 200 can then operate at peak energy efficiency.

More particularly, as can also be readily appreciated from FIG. 2, it is seen that the damper mechanism 206 comprises a vertically oriented curtain comprising a plurality of vertically hanging, independently movable, strips of material 210 whereby, as the food item is inserted into the radiant toaster 200, the food item will effectively cause some of the plurality of vertically hanging, independently movable strips of material 210 to be moved or deflected laterally toward the sides of the radiant toaster 200, and out of the way of the food item being inserted into the radiant toaster 200. When the food item has been fully inserted into the radiant toaster 200 and has effectively cleared the entry port 204, the vertically oriented, hanging strips 210 will automatically return to their normal, vertically hanging dependent positions so as to again cover or close off the entry port 204 of the radiant heater 200 in order to preserve thermal energy within the radiant heater 200.

Figure 3:
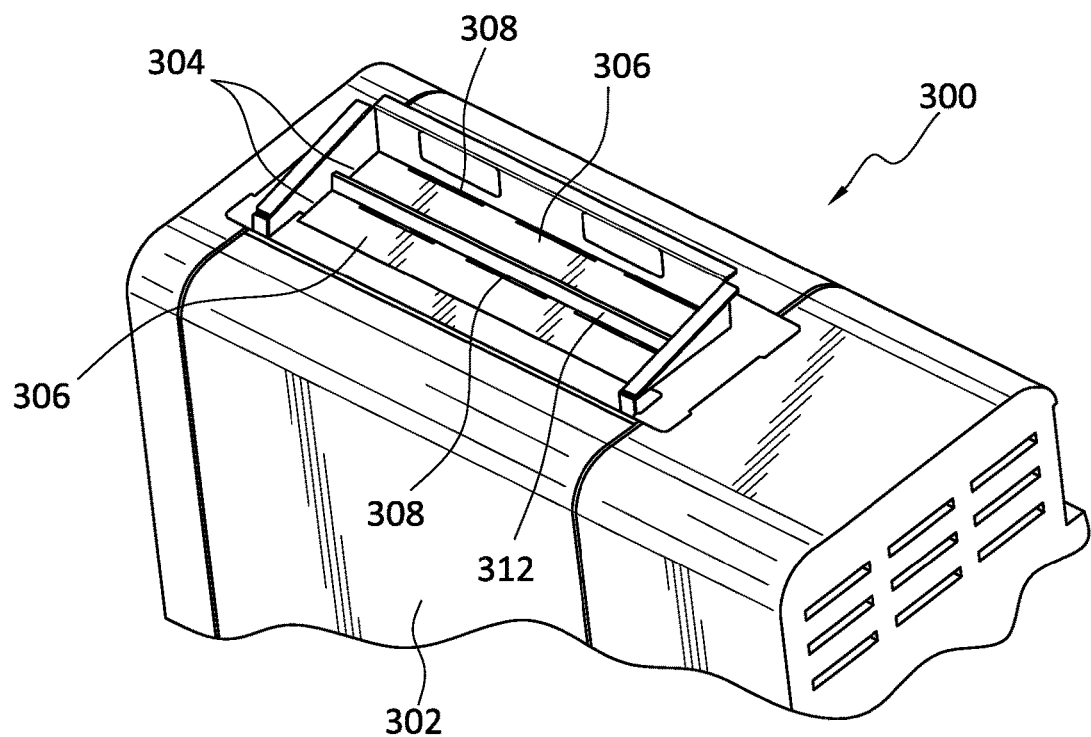
FIG. 3 is a schematic view of a contact toaster having a vertically oriented entry port defined within a top wall portion of a contact toaster for permitting food items to be inserted into the contact toaster so as to be toasted, and where a third embodiment of a damper mechanism, constructed in accordance with the principles and teachings of the present invention, is provided as one or more pivotal damper mechanisms which are effectively caused to be deflected and thereby pivoted downwardly and inwardly into the contact toaster, around horizontally oriented pivotal axes, as the food item is inserted into the radiant toaster through its entry port, whereby once the food item has been fully inserted into the contact toaster and effectively clears the entry port leading into the contact toaster, the damper mechanisms will be returned to their normal undeflected positions as a result of being spring-biased toward such normal undeflected positions so as to again cover or close off the entry port in order to preserve thermal energy within the contact heater.

With reference now being made to FIG. 3, food equipment, similar to the radiant heaters 100,200 as disclosed within FIGS. 1 and 2, and having a third embodiment damper mechanism operatively associated therewith, is disclosed and is generally indicated by the reference character 300. It is to be noted that component parts of this third embodiment food equipment or appliance 300, that correspond to similar component parts of the first and second embodiment food equipment or appliances 100,200, will be designated by corresponding reference characters except that they will be in the 300 series. More particularly, it is seen that the third embodiment food equipment or appliance comprises a contact toaster 300 having a cabinet or housing 302 within which suitable contact toasting components, not shown, are disposed. It is also seen that the upper or top wall of the radiant toaster cabinet or housing 302 is provided with a vertically oriented entry port 304 for permitting food items to be inserted into the contact toaster 300 so as to be toasted. A third embodiment damper mechanism 306, as constructed in accordance with the principles and teachings of the present invention, is provided at the entry port 304 so as to normally cover or close off the entry port 304 while the contact toaster 300 is being used to toast food items that have been inserted into the contact toaster cabinet or housing 302, as well as when the contact toaster 300 is not actually being used to toast food items, such as, for example, during those times when patron orders for toasted food items are not being processed. This normally closed disposition of the damper mechanism 306 with respect to the contact toaster cabinet or housing 302 serves to effectively enclose or seal the contact toaster cabinet or housing 302 so to prevent thermal energy disposed within the contact toaster cabinet or housing 302 from escaping from the contact toaster cabinet or housing 302, or conversely, for preventing relative cooler ambient air, external to the contact toaster cabinet or housing 302, from entering or invading the heated internal region of the contact toaster cabinet or housing 302. In either case, it can be readily appreciated that the heated environment contained internally within the contact toaster cabinet or housing 302 will be preserved as best as possible so as to, in turn, preserve the thermal energy disposed internally within the contact toaster cabinet or housing 302 whereby the contact toaster 300 can then operate at peak energy efficiency.

More particularly, as can also be readily appreciated from FIG. 3, it is seen that the damper mechanism 306 actually comprises a pair of horizontally oriented damper mechanisms 306,306 which effectively cover a pair of entry ports 304,304 which conventionally define a pair of slots into which, for example, slices of bread, muffins, buns, or the like, can be inserted so as to undergo a toasting operation. The pair of damper mechanisms 306,306 are pivotally mounted upon the contact toaster appliance housing 302 so as to be capable of pivoting downwardly and inwardly into the contact toaster appliance housing 302, as a result of being pivotally movable with respect to the contact toaster appliance housing 302 around respective pivot or hinge mechanisms 308,308, when the damper mechanisms 306, 306 are deflected as a result of the insertion of food items into the entry ports or slots 304,304. When the food items have been fully inserted into the contact toaster 300 and have effectively cleared the entry ports 304,304, the damper mechanisms 306,306 will return to their normal, horizontally oriented positions so as to again cover, close off, or seal the entry ports 304,304 of the contact heater 300 in order to preserve thermal energy within the contact heater 300. It is seen that the central portions of the damper mechanism 306,306, when disposed at their normal, undeflected positions, abut a centrally located structural component 312 of the contact toaster 300.

Figure 4:
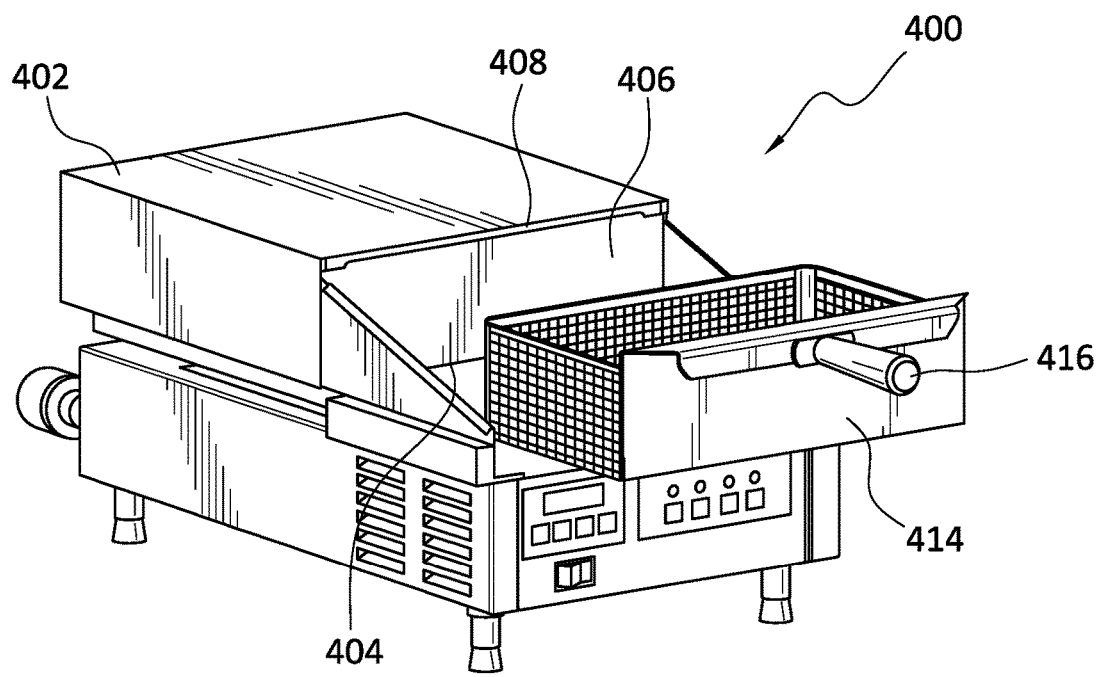
FIG. 4 is a schematic view of a steamer having a horizontally oriented entry port defined within a front or side wall portion of the steamer for permitting food items to be inserted into the steamer so as to undergo cooking or preparation as a result of being exposed to steam, and where a fourth embodiment of a damper mechanism, constructed in accordance with the principles and teachings of the present invention, is provided at the entry port and comprises a pivotal damper mechanism which is effectively caused to be deflected, and thereby pivot upwardly and inwardly into the steamer, around a horizontally oriented pivotal axis, as the food item is inserted into the steamer through its entry port, wherein it is further noted that the food item or items to be steamed are usually disposed within a tray or basket having a handle fixedly secured to a front wall or face of the tray or basket so as to permit food preparation personnel to easily manipulate the tray or basket having the food items disposed therein, and therefore, once the tray or basket has been fully inserted into the steamer, the damper mechanism will be maintained at its pivotal upward and inward position while the tray or basket also remains inserted into the steamer equipment such that the tray or basket effectively covers or closes off the entry port of the steamer, however, when the tray or basket is removed from the steamer equipment, upon completion of the food steam-cooking process, the damper mechanism will then be permitted to return to its normal or original position, as a result of being spring-biased toward such normal or original position, whereby the damper mechanism will now serve to cover or close off the entry port of the steamer equipment so as to preserve thermal energy within the steamer equipment.

With reference now being made to FIG. 4, another type of food equipment, and having a fourth embodiment damper mechanism operatively associated therewith, is disclosed, and is generally indicated by the reference character 400. It is to be noted that component parts of this fourth embodiment food equipment or appliance 400, that correspond to similar component parts of the first, second, and third embodiment food equipment or appliances 100,200,300 will be designated by corresponding reference characters except that they will be in the 400 series. More particularly, it is seen that the fourth embodiment food equipment or appliance comprises a steamer 400 having a cabinet or housing 402 within which suitable cooking components, not shown, for accomplishing, for example, flash steaming of food items, are disposed. It is also seen that a front wall portion of the steamer cabinet or housing 402 is provided with a horizontally oriented entry port 404 for permitting food items to be inserted into the steamer appliance e 400 so as to undergo cooking or preparation as a result of being exposed to steam, and wherein a fourth embodiment of a damper mechanism 406, constructed in accordance with the principles and teachings of the present invention, is provided at the entry port 404. The damper mechanism 406 comprises a pivotal damper mechanism which is effectively caused to be deflected, and thereby pivotally moved upwardly and inwardly into the steamer appliance 400, around a horizontally oriented pivot or hinge mechanism 408, as the food item is inserted into the steamer appliance 400 through its entry port 404.

It is further noted that the food item or items to be steamed are usually disposed within a tray or basket 414 having a handle 416 fixedly secured to a front wall or face of the tray or basket 414 so as to permit food preparation personnel to easily manipulate the tray or basket 414 having the food items disposed therein. Accordingly, once the tray or basket 414 has been fully inserted into the steamer appliance 400, the damper mechanism 406 will be maintained at its pivotal upward and inward position while the tray or basket 414 also remains inserted within the steamer equipment or appliance 400 such that the tray or basket 414 effectively covers or closes off the entry port 404 of the steamer appliance 400, however, when the tray or basket 414 is removed from the steamer equipment or appliance 400, upon completion of the food steam-cooking process, the damper mechanism 406 will then be permitted to return to its normal or original position, as a result of being spring-biased toward such normal or original position, whereby the damper mechanism 406 will now serve to cover or close off the entry port 404 of the steamer equipment or appliance 400 so as to preserve thermal energy within the steamer equipment. As was the case with the previous types of food equipment and their damper mechanisms, the damper mechanism 406 serves to effectively enclose or seal the steamer appliance housing 402 so to prevent thermal energy disposed within the steamer cabinet or housing 402 from escaping from the steamer cabinet or housing 402, or conversely, for preventing relative cooler ambient air, external to the steamer cabinet or housing 402, from entering or invading the heated internal region of the steamer cabinet or housing 402. In either case, it can be readily appreciated that the heated environment contained internally within the steamer cabinet or housing 402 will be preserved as best as possible so as to, in turn, preserve the thermal energy disposed internally within the steamer cabinet or housing 402 whereby the steamer appliance 400 can then operate at peak energy efficiency.

Figure 5:
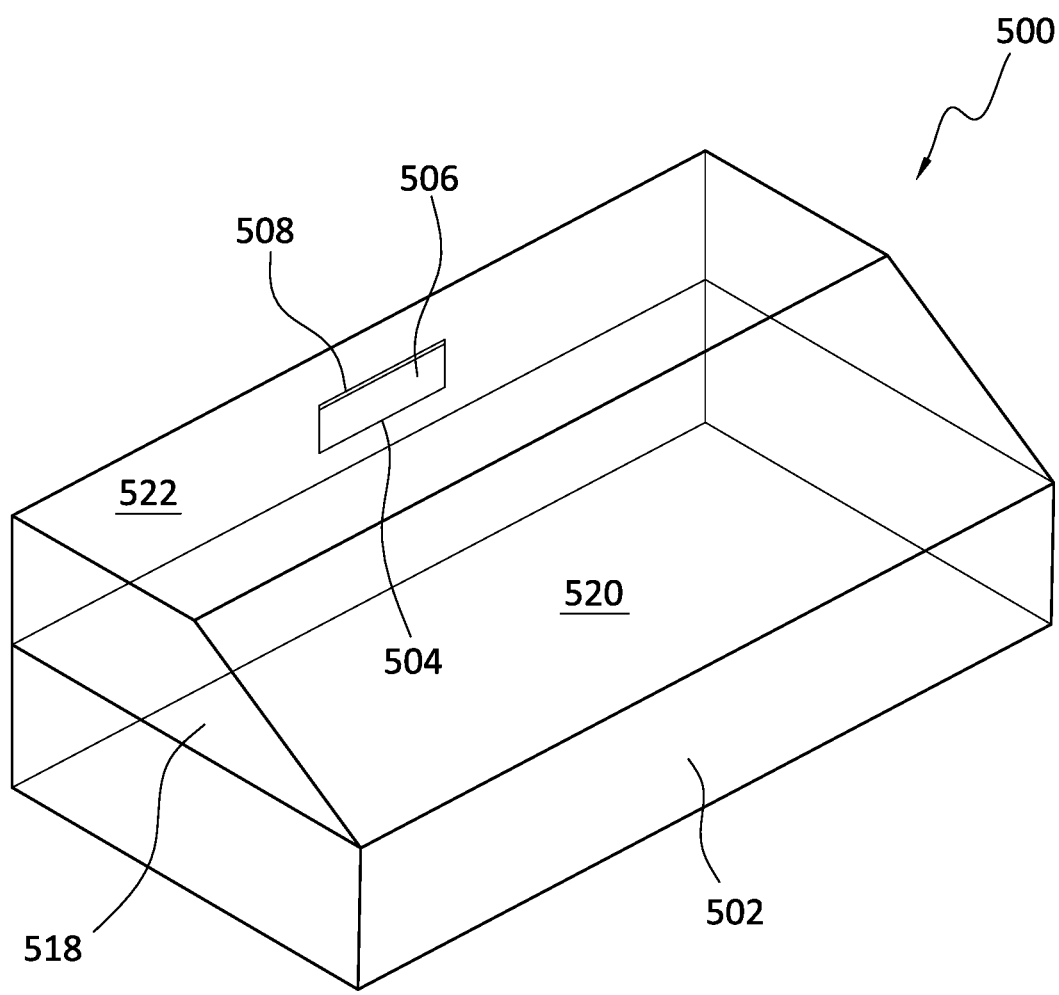
FIG. 5 is a schematic view of a refrigerated or frozen food storage container, such as, for example, a refrigerated or frozen food display case within a grocery store, having a horizontally oriented food conveyance port defined within a rear wall portion of the display case for permitting food items to be removed from the refrigerated or frozen food storage container by food service personnel when, for example, a store patron wants to better view the food item than simply peering through the front window of the display case, and where a fifth embodiment of a damper mechanism, constructed in accordance with the principles and teachings of the present invention, is provided at the food conveyance port and comprises a pivotal damper mechanism which is effectively caused to be deflected, and thereby pivot upwardly and inwardly into the display case, or alternatively, to be pulled outwardly and upwardly, around a horizontally oriented pivotal axis, so as to permit the food service personnel to reach into the food display case and extract the food item from the display case such that the store patron can better examine the food item so as to, for example, read the ingredient label for information, whereupon the food item being extracted from the display case, the damper mechanism will then be permitted to return to its normal or original undeflected position, as a result of being spring-biased toward such normal or original undeflected position, whereby the damper mechanism will again serve to cover or close off the food conveyance port of the display case so as to preserve the refrigerated or frozen environment defined within the display case.

With reference lastly being made to FIG. 5, a refrigerated or frozen food storage container, such as, for example, a refrigerated or frozen food display case within a grocery store, having a fifth embodiment damper mechanism operatively associated therewith, is disclosed and is generally indicated by the reference character 500. It is to be noted that component parts of this fifth embodiment food equipment or appliance 500, that correspond to similar component parts of the first, second, third, and fourth embodiment food equipment or appliances 100,200,300,400 will be designated by corresponding reference characters except that they will be in the 500 series. More particularly, it is seen that the fifth embodiment food equipment or appliance comprises a refrigerated or frozen food display case 500, such as, for example, a refrigerated or frozen food display case that is commonly seen within grocery stores, wherein the display case 500 comprises a cabinet or housing 502 within which a shelf 518 is provided for displaying refrigerated or frozen food items which may be seen by store patrons as they look through a front glass panel or window 520 of the display case 500. It is also seen that a rear wall portion 522 of the display case 502 is provided with a horizontally oriented entry or food conveyance port 504, located within a substantially central region of the rear wall portion 522, which permits food items to be inserted into, or extracted from, the interior region of the display case 502 by food service personnel. In conjunction with the entry or food conveyance port 504, there is provided a fifth embodiment of a damper mechanism 506 which has been constructed in accordance with the principles and teachings of the present invention, and it is seen that the damper mechanism 506 comprises a pivotal damper mechanism which is effectively caused to be deflected, and thereby pivotally moved upwardly and inwardly into the interior region of the display case 500, around a horizontally oriented pivot or hinge mechanism 508, as the food item is inserted into the display case 500 through its entry port 504.

Alternatively, the damper mechanism 506 may comprise a pivotal damper mechanism which is effectively caused to be deflected, and thereby pivotally moved upwardly and outwardly away from the rear wall 522 of the display case around the horizontally oriented pivot or hinge mechanism 508 in order to likewise permit a food item to be inserted into, or extracted out from, the display case 500 through its entry port 504. When the food item has been completely inserted into, or extracted from, the display case 502, the damper mechanism 506 will of course be permitted to return to its normal or original undeflected position, as a result of being spring-biased toward such normal or original undeflected position, whereby the damper mechanism 506 will again serve to cover or close off the food conveyance port 504 of the display case so as to preserve the refrigerated or frozen environment defined within the display case. As was the case with the previous types of food equipment and their damper mechanisms, the damper mechanism 506 serves to effectively enclose or seal the display case appliance housing 502 so to prevent the refrigerated or frozen environment disposed or contained within the display case housing 502 from escaping from the display case housing 502, or conversely, for preventing relative warm ambient air, external to the display case cabinet or housing 502, from entering or invading the refrigerated or frozen internal region of the display case cabinet or housing 502. In either case, it can be readily appreciated that the refrigerated or frozen environment contained internally within the display case cabinet or housing 502 will be preserved as best as possible so as to, in turn, preserve the refrigerated or frozen environment disposed internally within the display case cabinet or housing 502 whereby the refrigerated or frozen display case appliance 500 can then operate at peak energy efficiency.

Obviously, many variations and modifications of the present invention are possible in light of the above teachings. It is therefore to be understood that within the scope of the appended claims, the present invention may be practiced otherwise than as specifically described herein.

REFERENCE NUMBER KEY

100—Radiant toaster appliance
102—Housing of appliance 100
104—Food item entry port of appliance 100
106—First embodiment damper mechanism of appliance 100
108—Pivot or hinge mechanism for damper mechanism 106
200—Radiant toaster appliance
202—Housing of appliance 200
204—Food item entry port of appliance 200
206—Second embodiment damper mechanism of appliance 200
208—Pivot or hinge mechanism for damper mechanism 206

210—Vertically hanging, movable strips of material of damper 206
300—Contact toaster appliance
302—Housing of appliance 300
304—Food item entry ports of appliance 300
306—Third embodiment damper mechanisms of appliance 300
308—Pivot or hinge mechanisms for damper mechanisms 306
312—Central structure of appliance 300
400—Steamer appliance
402—Housing of appliance 400
404—Food item entry port of appliance 400
406—Fourth embodiment damper mechanism of appliance 400
408—Pivot or hinge mechanism for damper mechanism 406
414—Basket for food items for steamer 400
416—Handle on basket 414
500—Refrigerated or frozen display case appliance
502—Housing of appliance 500
504—Food item entry port of appliance 500
506—Fifth embodiment damper mechanism of appliance 500
508—Pivot or hinge mechanism for damper mechanism 606
518—Food item display shelf within display case 500
520—Front glass panel or window of display case 500
522—Rear wall of display case 500

What is claimed as new and desired to be protected by Letters Patent, is:

1. A food equipment appliance, comprising:
a housing defining an interior region within which a predetermined thermal environment is contained;
a wall portion comprising a part of said housing;
a pair of entry ports defined within said wall portion of said housing;
a structural bar located between said pair of entry points; and
a pair of damper mechanisms, at least one of which is pivotally mounted upon said structural bar, disposed at first default positions at which said damper mechanisms cover said pair of entry ports defined within said wall portion of said housing so as to preserve said predetermined thermal environment contained within said housing, and adapted to be deflected inwardly into said housing to second positions so as to uncover said entry ports and thereby permit food items to be inserted into said housing.

2. The appliance as set forth in claim 1, wherein:
said damper mechanisms will automatically return to said first position covering said entry ports of said housing once the food items have been inserted into said housing.

3. The appliance as set forth in claim 1, wherein:
said appliance is a radiant toaster.

4. The appliance as set forth in claim 3, wherein:
said wall portion of said housing of said appliance is a front wall portion of said housing.

5. The appliance as set forth in claim 1, wherein:
said appliance is a contact toaster.

6. The appliance as set forth in claim 1, wherein:
said wall portion of said housing of said appliance is a top wall portion of said housing.

7. The appliance as set forth in claim 3, further comprising:
hinge mechanisms for hingedly mounting said damper mechanisms upon said structural bar and said wall portion of said housing of said radiant toaster.

8. The appliance as set forth in claim 5, further comprising:
hinge mechanisms for hingedly mounting said damper mechanisms upon said structural bar and said wall portion of said housing of said contact toaster.

9. The appliance as set forth in claim 1, wherein
said appliance is a steamer appliance.

10. The appliance as set forth in claim 9, wherein:
said wall portion of said housing of said appliance is a front wall portion of said housing.

11. The appliance as set forth in claim 9, further comprising:
a hinge mechanism for hingedly mounting said damper mechanism upon said wall portion of said housing of said appliance.

12. A food equipment appliance, comprising:
a housing defining an interior region within which a predetermined thermal environment is contained;
a wall portion comprising a part of said housing;
an entry port defined within said wall portion of said housing;
a damper mechanism disposed at a first default position at which said damper mechanism covers said entry port defined within said wall portion of said housing so as to preserve said predetermined thermal environment contained within said housing, and adapted to be deflected inwardly into said housing to a second position so as to uncover said entry port and thereby permit a food item to be inserted into said housing; and
a basket, within which the food items are to be disposed, which is insertable through said entry port of said housing into said appliance so as to cause said damper mechanism to be deflected from said first position to said second position as a result of the insertion of said basket into said housing of said appliance and which will remain at said second deflected position until the food item is fully cooked and said basket is removed from said housing of said appliance whereupon said damper mechanism will automatically return to said first position covering said entry port of said housing of said appliance.

13. The appliance as set forth in claim 12, further comprising:
a handle fixedly secured to said basket so as to permit food service personnel to manipulate said basket into and out of said housing of said steamer appliance.

14. A food equipment appliance, comprising:
a housing defining an interior region within which a predetermined thermal environment is contained;
a wall portion comprising a part of said housing;
an entry port defined within said wall portion of said housing; and
a damper mechanism disposed at a first default position at which said damper mechanism covers said entry port defined within said wall portion of said housing so as to preserve said predetermined thermal environment contained within said housing, and adapted to be deflected laterally toward one or more sides of said housing to a second position so as to uncover said entry port and thereby permit a food item to be inserted into said housing and, once the food item has been inserted into said housing, said damper mechanism will automatically return to said first default position covering said entry port of said housing.

15. The appliance as set forth in claim 14, wherein:
said appliance is a radiant toaster.

16. The appliance as set forth in claim 14, wherein:
said wall portion of said housing of said appliance is a front wall portion of said housing.

17. The appliance as set forth in claim 14, wherein:
said damper mechanism comprises a plurality of vertically oriented, independently hanging strips, some of which may be deflected laterally toward one or more sides of said housing so as to uncover said entry port of said housing in order to permit food items to be inserted into said housing.

18. A food equipment appliance, comprising:
a housing defining an interior region within which a predetermined thermal environment is contained;
a wall portion comprising a part of said housing;
an entry port defined within a central region of said wall portion of said housing; and
a damper mechanism disposed at a first position at which said damper mechanism covers said entry port defined within said wall portion of said housing so as to preserve said predetermined thermal environment contained within said housing, and adapted to be deflected outwardly with respect to said wall portion of said housing to a second position so as to uncover said entry port and thereby permit a food item to be inserted into said housing and, once the food item has been inserted into said housing, said damper mechanism will automatically return to said first position covering said entry port of said housing.

19. The appliance as set forth in claim 18, wherein:
said appliance comprises a refrigerated or frozen food display case.

* * * * *